US007382361B2

(12) United States Patent
Burström et al.

(10) Patent No.: US 7,382,361 B2

(45) Date of Patent: Jun. 3, 2008

(54) ELECTRONIC PEN, AND CONTROL DEVICE AND METHOD THEREOF

(75) Inventors: Stefan Burström, Lund (SE); Mattias Bryborn, Lund (SE); Peter Gredinger, Skurup (SE); Ola Strömberg, Staffanstorp (SE); Magnus Horrdin, Löddeköpinge (SE)

(73) Assignee: Anoto AB, Lund (SE)

( * ) Notice: Subject to any disclaimer, the term of this patent is extended or adjusted under 35 U.S.C. 154(b) by 394 days.

(21) Appl. No.: 10/501,136

(22) PCT Filed: Feb. 12, 2003

(86) PCT No.: PCT/SE03/00241

§ 371 (c)(1),
(2), (4) Date: Jul. 13, 2004

(87) PCT Pub. No.: WO03/069547

PCT Pub. Date: Aug. 21, 2003

(65) Prior Publication Data

US 2005/0030297 A1 Feb. 10, 2005

(30) Foreign Application Priority Data

Feb. 12, 2002 (SE) .................................... 0200419

(51) Int. Cl.

| | |
|---|---|
| ***G06F 3/033*** | (2006.01) |
| ***G06F 3/041*** | (2006.01) |
| ***G08C 21/00*** | (2006.01) |
| ***G06K 11/06*** | (2006.01) |

(52) U.S. Cl. .................................... 345/179; 178/19.04

(58) Field of Classification Search ................ 345/156, 345/179, 157, 161, 173; 178/19.04, 19.01
See application file for complete search history.

(56) References Cited

U.S. PATENT DOCUMENTS 3,528,295 A * 9/1970 Roggenstein et al. .. 73/862.541

(Continued)

FOREIGN PATENT DOCUMENTS

WO WO-99/23604 A1 5/1999

(Continued)

OTHER PUBLICATIONS

Dymetman, Marc and Max Copperman, "Intelligent Paper", Xerox Research Centre Europe, pp. 392-406, XP-002328425.

*Primary Examiner*—Amr A. Awad
*Assistant Examiner*—Stephen Sherman
(74) *Attorney, Agent, or Firm*—Birch, Stewart, Kolasch & Birch, LLP

(57) ABSTRACT

An electronic pen has a force sensor whose electrical resistance varies in accordance with the amount of force applied to the pen stem of the pen. The force sensor is a modular unit with an electrode and a closure, which are mutually arranged in an essentially electrically insulated initial position. The closure, which conveniently is cantilevered on the electrode, is adapted to receive axial forces from the pen stem and thereby to be urged to an activated position in electrical contact with the electrode. The closure is also arranged, on relaxation of the axial forces, to automatically spring from the activated position back to the initial position.

23 Claims, 5 Drawing Sheets

U.S. PATENT DOCUMENTS

| | | | | |
|---|---|---|---|---|
| 4,489,302 | A | 12/1984 | Eventoff | |
| 4,786,764 | A | 11/1988 | Padula et al. | |
| 5,294,792 | A | 3/1994 | Lewis et al. | |
| 5,296,837 | A | 3/1994 | Yaniger | |
| 5,357,062 | A | 10/1994 | Rockwell et al. | |
| 5,565,632 | A | 10/1996 | Ogawa | |
| 5,581,052 | A * | 12/1996 | Padula et al. | 178/19.04 |
| 5,661,506 | A | 8/1997 | Lazzouni et al. | |
| 5,852,434 | A | 12/1998 | Sekendur | |
| 5,981,883 | A | 11/1999 | Shriver | |
| 6,104,388 | A | 8/2000 | Nagai et al. | |
| 6,188,392 | B1 | 2/2001 | O'Connor et al. | |
| 6,417,845 | B1 | 7/2002 | Chen et al. | |
| 6,663,008 | B1 | 12/2003 | Pettersson et al. | |
| 6,674,427 | B1 | 1/2004 | Pettersson et al. | |
| 2004/0085286 | A1 * | 5/2004 | Wang et al. | 345/156 |

FOREIGN PATENT DOCUMENTS

| | | | |
|---|---|---|---|
| WO | WO-01/26032 | A1 | 4/2001 |
| WO | WO-01/26033 | A1 | 4/2001 |
| WO | WO-01/61451 | A2 | 8/2001 |
| WO | WO-01/61625 | A2 | 8/2001 |
| WO | WO-01/61636 | A2 | 8/2001 |
| WO | WO-01/62520 | A1 | 8/2001 |
| WO | WO-01/16691 | A1 | 3/2002 |

* cited by examiner

ELECTRONIC PEN, AND CONTROL DEVICE AND METHOD THEREOF

FIELD OF THE INVENTION

The present invention relates generally to electronic pens for recording of handwritten information.

BACKGROUND ART

Electronic pens have been developed as a complement to keyboards and mice for controlling computer-based systems and inputting information to them. Such a pen is associated with an internal and/or external position detector which electronically records the pattern of movements of the pen over a base and generates an electronic copy thereof, below referred to as electronic handwriting.

The position detector can be based on, for instance, recording of a position-coding pattern on the base, mechanical detection of movements, use of accelerometers and/or gyroscopes, triangulation of electromagnetic or acoustic signals, pressure detection in the base, recording of changes in an electromagnetic field, or a combination of such techniques.

In many electronic pens, the position detector is activated based on an output signal from a pressure sensor which is mechanically connected to the pen stem to detect when the pen is made to abut against a base.

When reproducing electronic handwriting on a display or a base, readability is frequently dependent on the fact that the reproduction also reflects dynamic parameters of the handwriting, such as the force of application of the pen stem during writing. The above pressure sensor should thus be designed to emit an output signal that is representative of the force of application.

An electronic pen of this type is known from e.g. U.S. Pat. No. 6,252,182 B1. The pen has a pen stem whose inner end is connected with a control block which is slidingly received in a cylindrical cavity in the body of the pen. Opposite to the control block, there is arranged in the cavity an electrode plate with an inner circular conductor and an outer helical conductor. A helical spring is arranged round the control block in the cavity for biasing the same away from the electrode element into abutment against a stop lug. On its side facing the electrode element, the control block has a pointed application element of conductive rubber. In an unloaded initial position, the application element with its point is received in a central guide hole in the electrode element and is in electrical contact with the circular conductor. When exerting a load on the pen stem, the application element is gradually urged against the electrode plate so that the contact surface between them increases, whereby the electrical resistance over the electrode plate gradually changes. Based on the voltage across the electrode plate, a measure of the pen stem's application force on a base is thus obtained.

A pen of the above construction, however, suffers from several drawbacks.

The sensor arrangement of the pen is relatively complicated to assemble, which makes production as well as repair and maintenance difficult and expensive.

Moreover the sensor arrangement of the pen will probably have a limited life by the point of the application element being quite heavily worn when cooperating with the guide hole in the electrode plate.

A further drawback is that the characteristics of the sensor arrangement, i.e. its functional relationship between application force and output signal, can only be modified within narrow limits and then by way of radical construction changes of the sensor arrangement.

Further examples of pressure-sensitive electronic pens are given in U.S. Pat. Nos. 6,104,388, 5,895,895, 5,571,997 and U.S. Pat. No. 5,548,092.

SUMMARY OF THE INVENTION

Thus an object of the present invention is to provide an electronic pen with a force sensor arrangement which is easy to mount and maintain.

It is also an object to provide such a pen whose force sensor arrangement is both reliable and durable.

A further object is to provide an electronic pen with a force sensor arrangement whose characteristics can be customised without radical changes of the construction of the arrangement.

These and other objects that will be evident from the following description are achieved wholly or partly by an electronic pen according to claim 1. Preferred embodiments are defined in the dependent claims.

According to the invention, both installation of the sensor arrangement in the pen and maintenance and service thereof are facilitated owing to the sensor arrangement being designed as a modular unit. The use of such a modular unit, in contrast to the approach of combining loose parts in the pen into a sensor arrangement, also allows good control over the tolerances of the cooperating parts. Furthermore, easy assembly of the sensor arrangement is made possible since the force-receiving element is designed with built-in spring action that returns it to the initial position.

The invention also enables modification of the characteristics of the sensor arrangement, without requiring radical construction changes, by modification of the material properties of the closure element, such as composition, thickness etc.

According to an embodiment, the force-receiving element is cantilevered in the sensor arrangement. This enables a compact sensor arrangement with small motions of the force-receiving element between the initial position and the activated position. This can, in turn, be converted into a small amount of wear on the parts included. In this embodiment, the force-receiving element's spring action can easily be provided about its fixing point in the sensor arrangement.

It is preferred that both the electrode element and the closure element be essentially planar since this further increases the possibility of the providing a compact sensor arrangement.

The sensor arrangement preferably comprises a sheet substrate with a closure area and an electrode area formed thereon, the substrate being bent such that the closure area and the electrode area form said closure element and said electrode element, respectively. Such a sensor arrangement is easy to manufacture and its construction can be made robust.

In one embodiment, the closure element is arranged as the force-receiving element in the sensor arrangement, which may be advantageous since the closure element can be a passive component which, in contrast to the electrode element, need not be connected directly to a voltage source.

The electrode element conveniently comprises two electrically separate conductor paths which form an active surface cooperating with the closure element. In one embodiment, at least a central surface portion of the active surface has an essentially uniform distribution of said conductor paths. This minimises the sensitivity of the sensor arrangement to any variations in the impact point of the application force on the electrode surface. Such variations may arise, for instance, as a result of the necessary tolerances or wear in the guiding of the pen stem in the pen.

According to an embodiment, the sensor arrangement comprises a spacer of electrically insulating material which, in said activated position, is arranged to at least partly encompass the active surface. The spacer thus holds peripheral portions of the force-receiving element at a distance from the other element while at the same time opposite portions of the force-receiving element are allowed to be urged into electrical contact with the active surface. The spacer can be in the form of protrusions on one or both of the closure and electrode elements. The above embodiment has been found to promote a stable output signal from the sensor arrangement by the spacer stabilising and controlling the contacting process between the closure and electrode elements in the activated position. This also minimises the risk of short circuit of the electrode element in case the closure and/or electrode elements are deformed in operation, as may occur at high operating temperatures.

In an embodiment, the closure element includes a pressure-sensitive material. It is thus possible to more or less customise the characteristics of the sensor arrangement by adaptation of the composition and/or thickness of the pressure-sensitive material.

The electronic pen according to the invention can further comprise a force-transmitting element which is attached to one end of the pen stem and has a rounded abutment surface for cooperation with the force-receiving element. The force-transmitting element aims at, inter alia, providing a consistent abutment surface against the force-receiving element, independently of the appearance of the end of the pen stem. Furthermore, the force-transmitting element can be designed to absorb the major part of the striking power that arises if the pen is dropped so that the pen stem hits the base. The rounded abutment surface gives the advantage that the force-transmitting element's engagement point on the force-receiving element is essentially independent of any inclination of the force-transmitting element. This reduces the requirements for tolerances in the guiding of the force-transmitting element and the pen stem in the pen, as well as the requirements for accuracy in mounting.

It is also preferred for the force-transmitting element to be made of an elastic material. Such a force-transmitting element can be softly engaged with the force-receiving element, which has been found to give a more even output signal from the sensor arrangement. The elastic material, in combination with a suitable construction of the electrode element, also allows a sensor arrangement whose output signal at least partly is a function of the abutment area between the force-transmitting element and the force-receiving element and, thus, the contact area between the closure and electrode elements.

According to an embodiment, the force-transmitting element defines a blind hole which is adapted to receive one end of the pen stem and whose peripheral wall has at least one longitudinal groove. Such a groove can conduct air into the pen stem to equalise a negative pressure that possibly forms in the pen stem as its marking fluid is being consumed. Such a negative pressure can potentially prevent, or at least interfere with, the dispensing of marking fluid from the pen stem. The groove also facilitates insertion of the end of the pen stem into the blind hole, which may be advantageous when the force-transmitting element is made of an elastic material which may have a high coefficient of friction.

Handheld electronic apparatus should survive a fall from reasonable heights. A sensitive point of an electronic pen is the pen stem, through which striking power can be conducted into the interior of the pen and there cause great damage. The major part of such striking power can be absorbed by the elastic force-transmitting element. This requires, however, that the end of the pen stem be prevented from cutting through the force-transmitting element. To this end, the force-transmitting element may comprise an insert of a hard and durable material which is arranged over the end wall of the blind hole.

To further promote the above-mentioned ventilation of the interior of the pen stem, the insert may, on its surface facing the blind hole, have at least one depression that extends from a central portion of the said surface and connects to said longitudinal groove. Such a depression can be provided by ribs and/or grooves of the surface of the insert.

The inventive electronic pen may also comprise an elongate holder defining a first and a second chamber, wherein the sensor arrangement is mounted in the first chamber and the force-transmitting element is slidingly received in the second chamber for longitudinal movement into the first chamber against the spring action of the force-receiving element. Such a holder forms a mounting unit which can easily be mounted and dismounted in the pen. The holder can hold the force-transmitting element in place when exchanging the pen stem, and can also contribute to guiding the force-transmitting element towards the sensor arrangement, which via the holder can be accurately located in the pen.

A further object of the present invention is to suggest a technique of minimising the power consumption during operation of an electronic pen with a pen stem and an associated force sensor.

This object is achieved by a control device and a method according to claims 25 and 32, respectively.

BRIEF DESCRIPTION OF THE DRAWINGS

The invention will be described below by way of example and with reference to the accompanying drawings which schematically illustrate currently preferred embodiments and in which.

DESCRIPTION OF PREFERRED EMBODIMENTS

Figure 1:
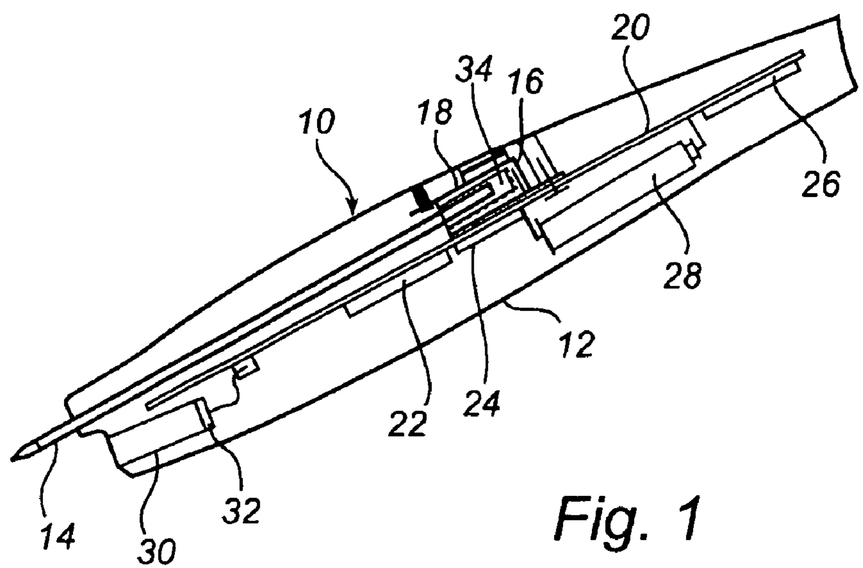
FIG. 1 is a side view of relevant inner parts of an electronic pen according to the present invention.

First a general introduction of the different components of the invention is given, with reference to FIG. 1. Then follows a detailed description of the central aspects of the invention, with reference to FIGS. 2-8. In the drawings, the same reference numerals are used throughout to identify equivalent parts.

1. Electronic Pen

The following description starts from a pen which electronically records handwritten information via optical detection of a position-coding pattern on a writing base. A full description of such a pen is given in WO 01/16691, WO 01/26032 and WO 01/26033 which in their entirety are incorporated herein by reference. However, it should be pointed out that the invention is also applicable to other types of electronic pens requiring a force-sensitive sensor.

The pen 10 in FIG. 1 comprises an elongate, hollow pen body 12, in which a pen stem 14 is inserted so that its end cooperates with a force sensor 16 which is mounted in a holder 18. The pen 10 also contains a printed circuit board 20 with electronic components that are necessary for controlling the pen, such as one or more processors 22, memory circuits 24 and communication units 26. Moreover the pen can comprise a battery 28 for feeding voltage to the printed circuit board 20. In an alternative embodiment, the pen is connected to an external power source. At the front end of the pen 10 an optical module 30 is mounted, containing optical components (not shown) and an image sensor 32 which is electrically connected to the printed circuit board 20.

The pen stem 14, which can be a writing means or a passive pointer, is exchangeable by being extracted from the pen body 12. The inner end of the pen stem 14 therefore is frictionally engaged in an activator 34 which is slidingly mounted in the holder 18. The activator 34 is arranged opposite to the force sensor 16 to transmit forces from the pen stem 14 to the force sensor.

Figure 2A:
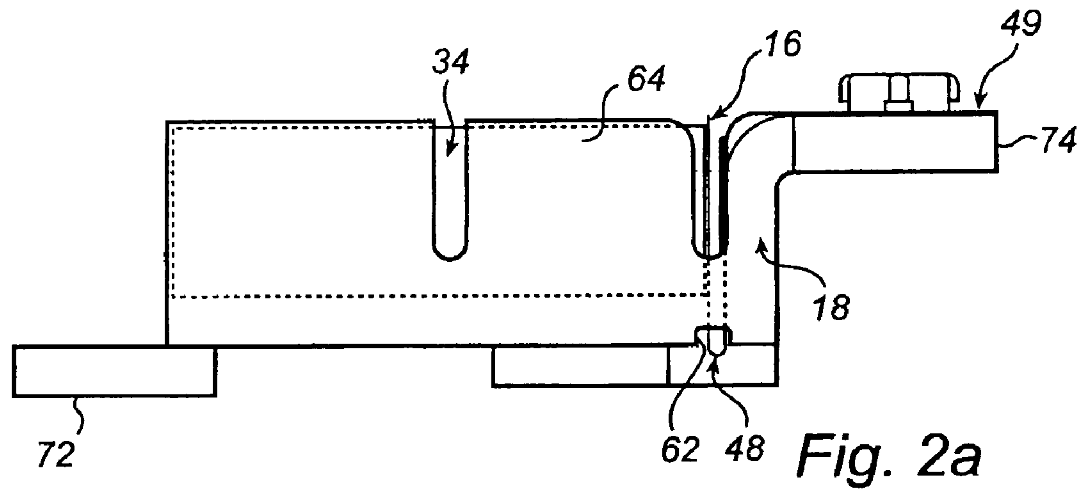
FIGS. 2*a* and 2*b* are side views of an inventive sensor arrangement in an initial position and an activated position, respectively.
Figure 2B:
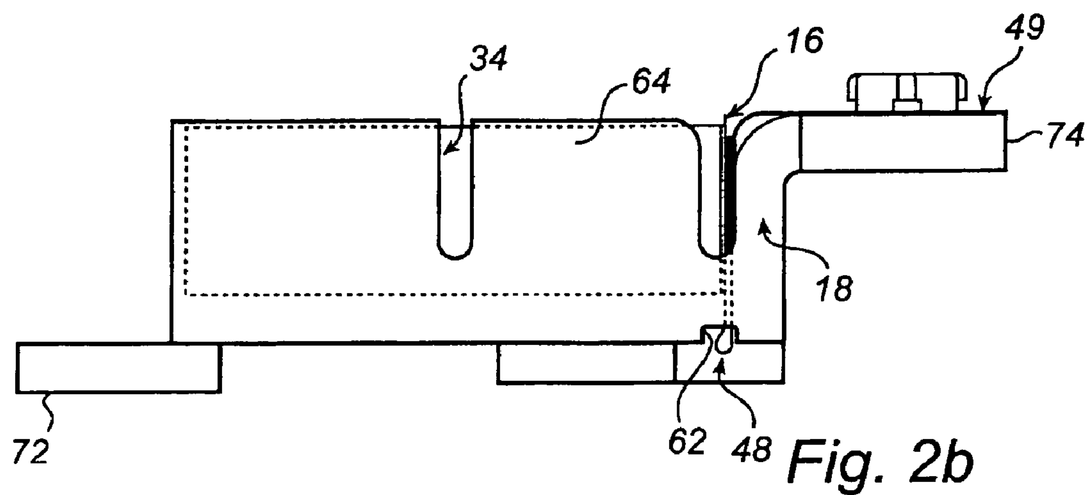

FIG. 2 illustrates the force sensor 16, the holder 18 and the activator 34 in more detail, on the one hand in an unloaded state (FIG. 2*a*) and, on the other hand, in a loaded, activated state (FIG. 2*b*). The activator 34 is slidingly moved between these positions, typically a distance of about 1-2 mm. The force sensor 16, the holder 18 and the activator 34 will be described in more detail with reference to FIGS. 3-5.

Reference once more being made to FIG. 1, the pen 10 can take three different operation modes: a fully switched-off state, a waiting state and an active state. The pen 10 is switched on and off by means of a switch (not shown), which can be implemented as an on/off button on the pen, or as a sensor for sensing when a protective cap (not shown) is removed from the pen or when the pen stem 14 is pressed out of the pen body 12.

Once the pen 10 is switched on but unloaded, for instance when the user has put it down or between pen strokes, it is put in the waiting state, in which essentially all electronics is switched off to minimise the power consumption.

As soon as the axial load on the pen stem 14, given by the force sensor 16, exceeds a predetermined threshold, the pen changes from the waiting state to the active state, in which the electronics is activated and the optical module 30 is made to take images at a given sampling frequency. Each image is recorded from the image sensor 32 by a processing unit, such as the processor 22, which based on the reproduced position-coding pattern calculates the position of the pen stem 14 on the base. The processing unit 22 also reads the application force of the pen stem 14 for each image and generates associated pairs of positions and forces which can be transmitted to an external unit (not shown) via the communication unit 26 or stored locally in the memory 24. Based on these pairs of data, each electronically recorded pen stroke can be reproduced, in real time or on a subsequent occasion, with a stroke width which in a natural manner varies with the application force.

An electronic pen 10 of the above type should satisfy the following specifications. Each pen should have a given functional relationship, stable over time, between application force and measuring signal. The pen's measurement of force should be effected with high resolution within a relevant force range, typically from about 0.1 N to about 5 N. The pen should be able to withstand variations in environmental conditions, such as moisture and temperature. It is also desirable that the performance of the pen remain essentially the same also after a very large number of strokes, for instance 10 million strokes, and also after a large number of exchanges of pen stem, typically 300. The pen should also survive a fall from about 1 m with the pen stem against a base. Further the pen should leave the waiting state as soon as possible, which means that the force sensor should typically have a response time in the order of 1 ms. The power consumption should be minimal, at least if the pen is to be operated by a battery.

These specifications are satisfied by the pen that will be described in detail below with reference to FIGS. 2-8.

2. Force Sensor

To start with the force sensor 16 which is shown in FIG. 3, it is constructed from a sheet substrate 36 of electrically insulating material, typically a foil of plastic material, such as ethylene polyterephthalate (PET).

On the substrate 36, there is applied a layer of an electrode material forming an electrode 41 provided with two electrically separate conductor patterns 38, 40. The conductor patterns 38, 40 cooperate in an active area 42 via conductor projections 44 which extend between each other in an essentially uniformly distributed manner. By uniformly distributed manner is meant in this context that the total conductor surface area, within an impact area of a given size, is the same for both conductors 38, 40 independently of the impact point in the active area 42.

In a functioning embodiment, use is made of an electrode material which is a graphite layer with a thickness of about 0.01 mm which is applied to a PET substrate with a thickness of about 0.1 mm, the conductor projections being about 1 mm wide and having a mutual distance of about 1 mm. Of course, materials as well as dimensions can be selected entirely according to the desired performance. Other electrode materials comprise metals, such as silver and copper. An advantage of graphite is its formability and good adherence, which allows bending of the substrate (cf. FIG. 3*b*).

A thin layer (typically about 0.01 mm thick) of a closure material is also applied to the substrate 36. This closure material, which defines a closure 46, is such that, when pressed against the active surface 42, it conducts a current between the conductors 38, 40 when connected to a power source. The closure material is also suitably pressure-sensitive so that its electric resistance decreases with an increasing press force.

U.S. Pat. No. 4,489,302, which relates to force sensors in keys of electronic musical instruments and which in its entirety is incorporated herein by reference, discloses pressure-sensitive materials which are formed by mixing semiconductive particles with a resin material, for instance particles of molybdenum disulphide in acrylic plastic, the electric resistance of the material being given by the amount of particles.

U.S. Pat. No. 5,296,837, which in its entirety is incorporated herein by reference, discloses further pressure-sensitive, semiconductive materials which are formed by mixing particles of tin oxide with a conductive resin material, which in turn may consist of a mixture of carbon particles and a non-conductive resin material.

Thus there are a variety of potentially suitable closure materials, and a person skilled in the art can easily browse through them to obtain the desired performance.

Figure 3A:
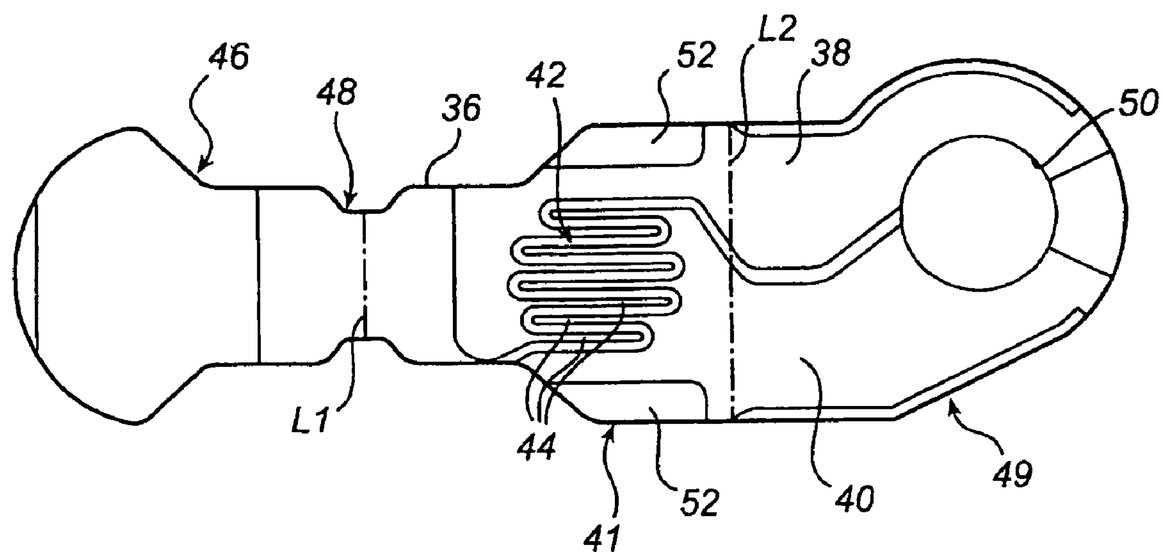
FIG. 3*a* is a top plan view of a substrate for forming the sensor arrangement in FIGS. 2*a*-2*b*.
Figure 3B:
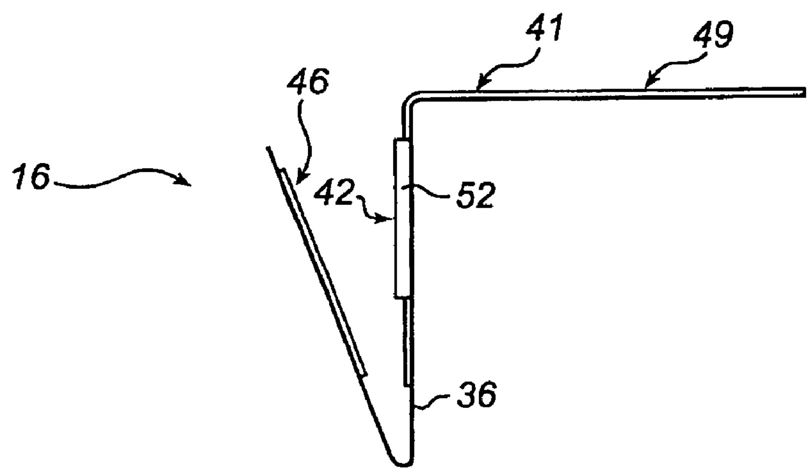
FIG. 3*b* is a side view of the substrate after appropriate forming.

The force sensor 16, which is shown in FIG. 3*b*, is made by forming the substrate 36 in FIG. 3*a*, more specifically by bending along the dashed lines L1, L2. This results in a force sensor 16 with a resilient closure 46 which is cantilevered to cooperate with the active surface 42 of the electrode 41. The spring force of the closure 46 is sufficient to return the pen stem 14 and the activator 34 from the activated position (FIG. 2*b*) to the initial position (FIG. 2*a*) when the pen is raised from the base. For a pen stem of about 1 g, the returning force of the closure should be at least about 15 mN, suitably about 30-100 mN, to minimise the risk that the pen is inadvertently activated when being shaken. With the above dimensions of the substrate, this can be achieved with an angle between the closure and the electrode of about 10-30 degrees. The web portion 48 between the electrode 41 and the closure 46 is waist-shaped to reduce the stress in the substrate material.

As is evident from FIG. 3*b*, the electrode 41 of the force sensor 16 is bent essentially at right angles to form a connecting portion 49 in which the conductors 38, 40 extend to a contacting hole 50. In the pen, the printed circuit board 20 (FIG. 1) is mounted against the connecting portion 49 so that the conductors 38, 40 at the periphery of the hole 50 are contacted with contact means (not shown) on the printed circuit board 20.

To stabilise the output signal of the force sensor, a spacer 52 of electrically insulating material, such as a dielectric material, typically with a thickness of about 0.02 mm, is applied round the active surface 42. In an alternative embodiment (not shown) the spacer completely encompasses the active surface.

3. Holder

Figure 4A:
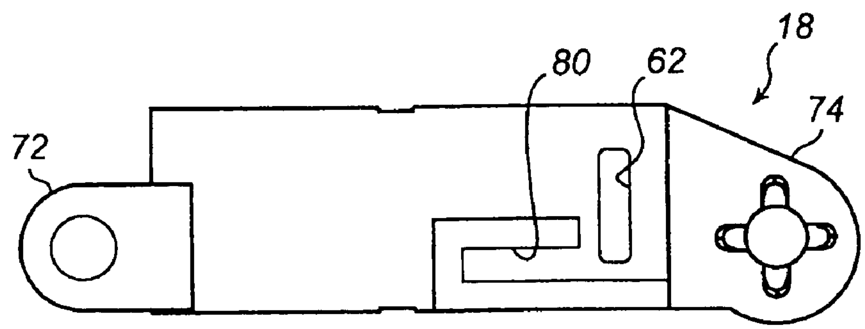
FIGS. 4*a* and 4*b* are opposite top plan views of a holder for the sensor arrangement in FIGS. 3*a*-3*b*.
Figure 4B:
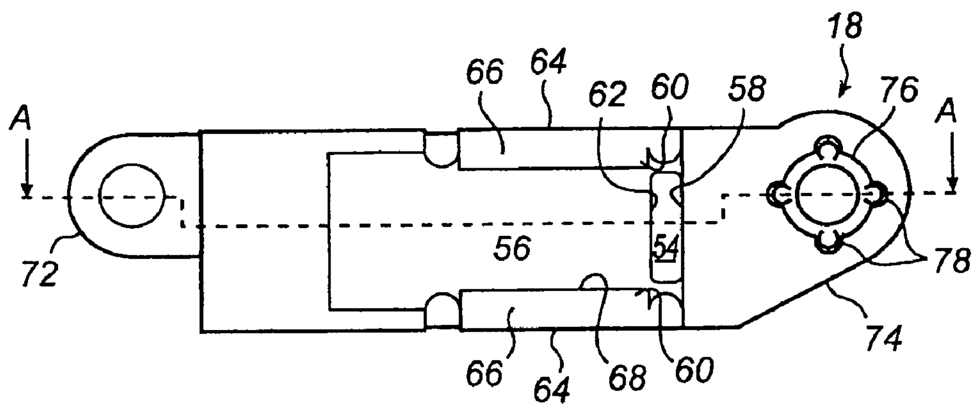
Figure 4C:
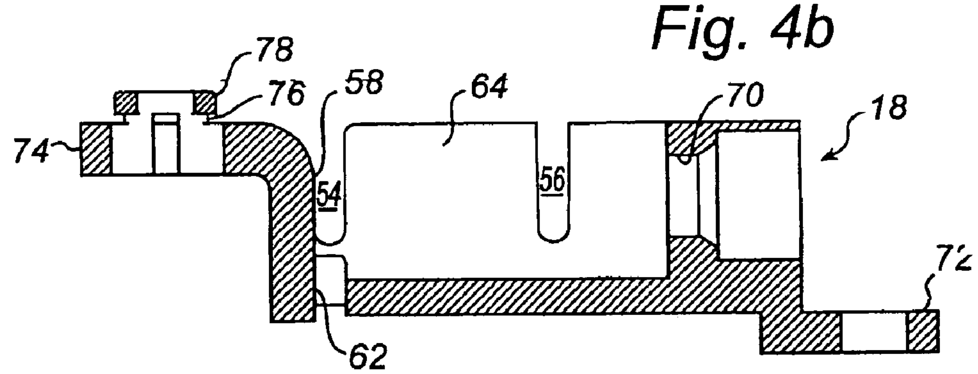
FIG. 4*c* is a sectional view of the holder along line A-A in FIG. 4*b*.

FIGS. 4*a*-4*c* show the holder 18 in more detail. The holder defines two chambers 54, 56 for receiving the force sensor 16 and the activator 34, respectively.

The sensor chamber 54 is axially defined by, on the one hand, an abutment wall 58 for the active surface 42 of the electrode 41 and, on the other hand, radially inwards extending locking lugs 60 for supporting the electrode 41 during mounting of the activator 34 in the activator chamber 56. The sensor chamber 54 further has a guide hole 62 which connects to the abutment wall 58 and is adapted to fix the position of the bent web portion 48 of the sensor 16 (FIGS. 2-3).

The sensor chamber 54 opens into the activator chamber 56 which is formed to receive the activator 34 with a certain play. The activator chamber 56 is defined by flexible side wall portions 64 with longitudinal hooks 66 defining a mounting opening 68 whose width is less than the width of the activator 34. When installing the activator 34 in the holder 18, the activator 34 is urged past the side wall portions 64 which then spring back and hold, with the hooks 66, the activator 34 in place in the chamber 56.

As is evident from FIG. 4*c*, the activator chamber 56 opens into a through duct 70 for receiving the pen stem 14 (FIG. 1).

The holder 18 further has flanges 72, 74 with through holes for fixing to the body 12 of the pen (FIG. 1), one flange 74 also serving as carrying surface for the connecting portion 49 of the electrode 41. The flange 74 also has a socket 76 with radial stubs 78 for securing the force sensor 16 to the flange 74 before the holder 18 is mounted in the pen. In a finally assembled pen (FIG. 1) the connecting portion 49 is held in place by means of the printed circuit board 20 which abuts against the flange 74.

As shown in FIG. 4*a*, the holder 18 has on its outside a guide groove 80 for cooperation with an upright guide plate (not shown) on the body 12 of the pen. This arrangement aims at preventing the holder 18 from being mounted in a slightly inclined manner relative to the pen stem 14 (FIG. 1), which could cause increased friction and wear between the activator 34 and the holder 18. The holder 18 is in fact mounted by the fixing hole of the flange 72 first being fixed to the body, for instance by the fixing hole being mounted on a fixing pin on the body which is then formed by thermal upsetting. Subsequently the printed circuit board 20 is placed on the holder 18, and a screw is inserted through a hole (not shown) in the printed circuit board 20, through the fixing hole of the flange 74 and into the body. However, the fixing hole should be oversized to minimise tension and any removal of material during insertion of the screw, since this would potentially interfere with contacting. By cooperation between the guide groove 80 and the guide plate, correct alignment of the holder 18 is guaranteed during insertion of the screw through the oversized fixing hole of the flange 74.

It should be pointed out that alternatively the holder 18 can be moulded as part of the body 12 (FIG. 1).

Furthermore the holder 18 can be designed to be mounted with the mounting opening 68 directed inwards to the body 12, i.e. away from the printed circuit board 20 (FIG. 1). This minimises the risk of electrostatic discharge between the printed circuit board 20 and any uncovered part of the pen stem 14 if this is made of metal.

4. Activator

Figure 5A:
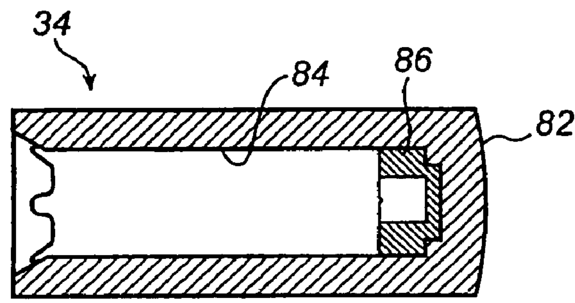
FIGS. 5*a* and 5*b* is a longitudinal sectional view and an end view, respectively, of an activator which transmits force from the pen stem of the pen to the sensor arrangement in FIGS. 2*a*-2*b*.
Figure 5B:
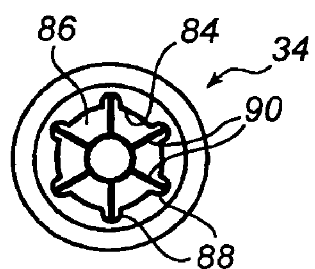

The activator 34, which is shown in more detail in FIGS. 5*a*-5*b*, is made of a yielding material to ensure, inter alia, soft engagement with the closure 46 and the electrode 41 and to take up any striking power from the pen stem.

The activator 34 has a rounded end 82 for engagement with the closure 46. Thus, the point of engagement of the activator 34 on the active surface 42 is stabilised, which results in a corresponding stabilisation of the output signal of the sensor.

At the other end of the activator 34, a blind hole 84 is formed to receive the rear end of the pen stem. A widened inlet facilitates the insertion of the stem end. In the base of the blind hole 84, a shock-absorbing insert 86 is arranged. Fall tests, where the pen is dropped from a height of one meter on a base, indicate that the pen when hitting the base is decelerated by at least about 200 G. A pen weighing about 40-50 g is thus subjected to loads in the order of 100 N. The end of the pen stem typically has a surface size of about 1-3 $mm^2$, and therefore the insert should be made of a hard and durable material which suitably is capable of withstanding pressures of up to at least about 30-100 $N/mm^2$.

As is evident from the end view in FIG. 5*b*, a plurality of longitudinal grooves 88 are distributed over the peripheral wall of the blind hole 84, on the one hand to facilitate the insertion of the stem end into the blind hole 84 and, on the other hand, to equalise any negative pressure in the pen stem 14. For the latter purpose, the insert 86 has radial ducts 98 extending from the centre of the insert 86 to its periphery.

In an exemplary embodiment, the activator is made of TPE (thermoplastic elastomer; hardness Shore 87A) having a width of 4 mm, a radius of curvature of the end of 10 mm and with an insert of fibre-reinforced ABS plastic which with a thickness of about 1 mm is moulded in situ in the blind hole.

Figure 6:
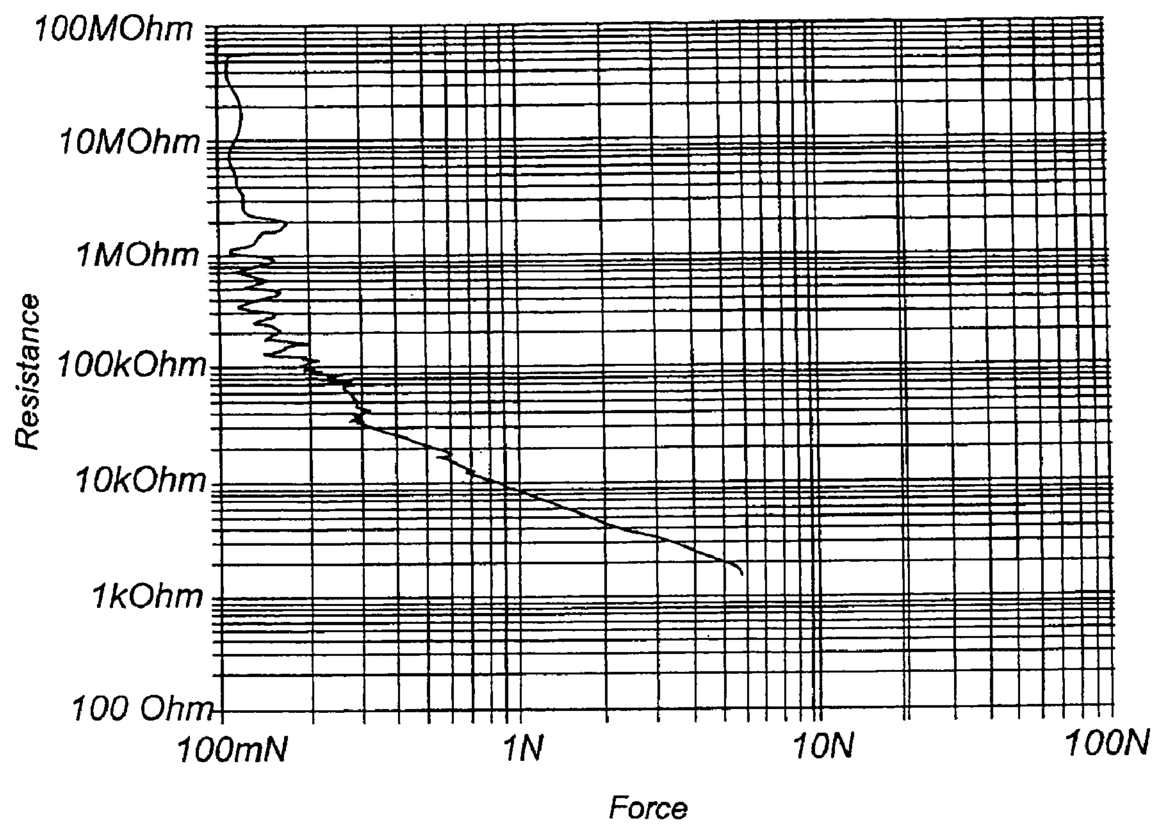
FIG. 6 is an exemplary diagram of the characteristics of the sensor arrangement.

FIG. 6 gives an example of a functional relationship between application force on the pen stem and electric resistance over a force sensor in an electronic pen of the type described above. It should be emphasised that variations in resistance in case of low loads are stressed by the diagram being given on a log-log scale.

5. Electronic Control

Figure 7:
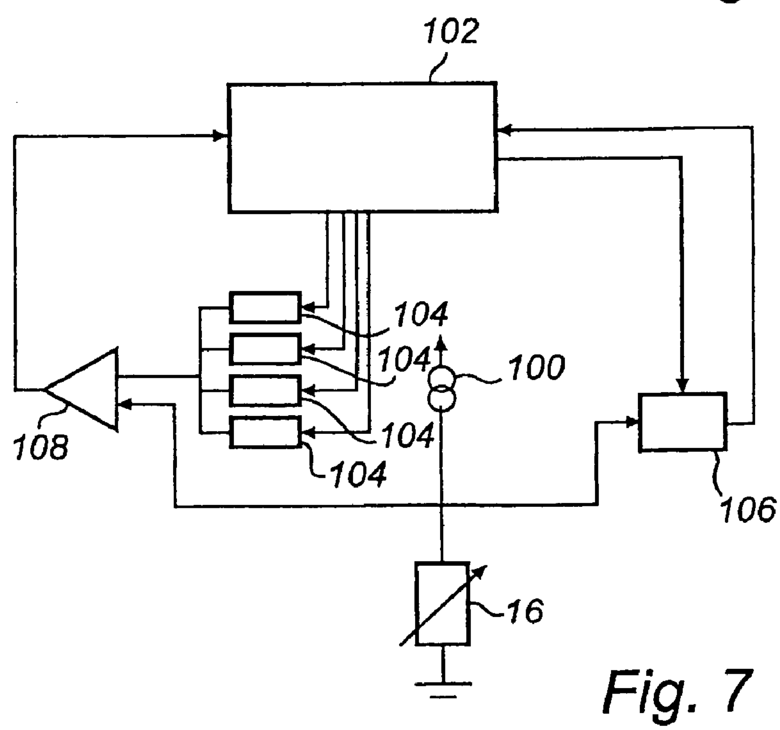
FIG. 7 is a diagram of an electric circuit for controlling an electronic pen of the kind shown in FIG. 1.

FIG. 7 shows a circuit for controlling an electronic pen. The circuit is electrically connected to the force sensor 16 as described above, which is connected to a constant current source 100 which in this example supplies about 15 mA.

The circuit further comprises a control unit 102 which can be implemented by a commercially available microcontroller or microprocessor (CPU), by a digital signal processor (DSP), or by another programmable logic device, such as an FPGA, or alternatively as a hardware circuit (ASIC), as discrete analog and digital components, or as a combination of the above.

The circuit further comprises a bank of resistors 104 which each via separate lines are connected to the control unit 102.

An AD converter 106 (ADC) is connected to receive an analog measuring signal corresponding to the voltage across the force sensor 16 and to emit a digital measuring signal which is received by the control unit 102. The AD converter 106 further has a control input which is connected to receive a control signal from the control unit 102.

A comparator 108 included in the circuit has two inputs, one connected to the resistor bank 104 for receiving a reference signal, and the other connected to receive the analog measuring signal from the force sensor 16. An output of the comparator 108 is connected to an interrupt input of the control unit 102. The comparator 108 is in the shown embodiment an integrated operation amplifier but can alternatively, for instance, be implemented as discrete components.

During manufacture of the pen, a final calibration step is carried out, in which the pen stem is subjected to a vertical load of 0.2 N and the control unit 102 is made to emit such a combination of voltage signals across the resistor bank 104 that the reference signal equals the measuring signal from the force sensor 16, which is detected by the control unit 102 by changes in the signal on the interrupt input. This requires, however, that the voltage across the force sensor 16 will be within a permissible range, in the example corresponding to a resistance of the force sensor 16 in the range 50-150 kOhm. The control unit 102 is then programmed to emit the combination of voltage signals each time it leaves its switched-off state.

Thus, as long as the pen is not switched off, the control unit 102 feeds the reference signal to the reference input of the comparator 108.

When the pen is switched on and automatically changes to its waiting state, the AD converter 106 remains switched off since the control unit 102 does not emit an activating signal to the control input of the converter 106. As long as the force sensor 16 is subjected to a load of less than 0.2 N, the voltage on the measuring signal input of the comparator 108 will exceed the reference voltage and the output signal of the comparator 108 will assume a value (high/low) which does not cause the control unit 102 to change its state. It will be appreciated that the power consumption is minimal since essentially no electric current flows through the circuit and the control unit 102 can be switched off, or only operate at a low clock frequency, typically 100-500 Hz, for instance to intermittently check that the battery charge is sufficient, that the optical module is ready to record images, that relevant memory registers are ready to receive images etc.

When the load exerted on the force sensor 16 exceeds the reference force (0.2 N), its resistance decreases (cf. FIG. 6) and, thus, also the voltage across the force sensor 16. The comparator 108 then emits an interrupt value, IRQ, (low/high) on its output, which immediately causes the control unit 102 to increase the clock frequency, typically to about 100 MHz. In this active state, the control unit 102 effects triggering of the optical module 30 (FIG. 1) to record images at a fixed sampling frequency, typically about 100 Hz, and synchronous triggering of the AD converter 106 on the control input to generate a digital 8-bit force value corresponding to the application force. The control unit 102 also triggers synchronous reading of a digital image from the image sensor 32 of the optical module 30. After decoding the image, which can be controlled by the control unit 102 or a separate processing unit, a logical connection between the decoded position and the generated force value takes place.

As soon as the load exerted on the force sensor 16 falls below the reference force, the interrupt signal on the output of the comparator 108 disappears and the control unit 102 returns to its waiting state.

According to an alternative embodiment (not shown), the circuit has no separate AD converter (106 in FIG. 7). Instead the control unit 102 is designed to generate the reference signal in the waiting state via the resistor bank 104, and to change to the active state as soon as the output signal from the comparator 108 changes states. In the active state, the control unit 102 is designed to control the voltage distribution over the resistor bank 104 for digital conversion of the analog measuring voltage on the measuring signal input of the comparator 108, the output signal from the comparator 108 being used as feedback signal in this conversion. The control unit 102 then returns to the waiting state as soon as the digital force value is found to be below a digital reference value, which is determined and stored in the control unit 102 in the above calibration step.

The alternative embodiment enables saving of components and, thus, a reduction of both cost and space requirement. In a currently particularly preferred embodiment, the control unit, the comparator and the resistor bank are implemented as a programmable AD converter.

In the two embodiments above, an AD conversion of the analog measuring signal of the force sensor is supplemented with a power-saving comparison of the same with a reference signal. Thus, instead of continuously AD converting the measuring signal at a fixed high frequency and, from this, controlling the states of the pen, the pen is switched between a low power state with simple level detection of the measuring signal and a high power state with AD conversion of the measuring signal and simultaneous position detection.

In both embodiments, the analog measuring signal of the force sensor is digitised, within a voltage range $V_{min}$-$V_{max}$, over a given number of equidistant levels or states, for instance 256 (8 bits). Since there is a strongly non-linear (logarithmic) relationship between the measuring signal (voltage/resistance) and the applied force (cf. FIG. 6), the resolution in force will vary over the voltage range. If a certain minimum resolution, for instance 50 mN (5 g load), is to be achieved over the entire voltage range, an AD converter with a large number of levels (bits) is required. Such an AD converter can be undesirably expensive and/or energy requiring.

This problem can be overcome by the control circuit being allowed to operate with at least two different AD conversion ranges, which is achieved by controlling the AD converter and/or the constant current source.

In the first-mentioned embodiment, the voltage range $V_{min}$-$V_{max}$ of the AD converter is conveniently controlled so that a desired resolution is achieved, preferably by controlling the reference voltage or reference voltages defining the voltage range. Controlling can be effected by an external or an internal control unit which thus shifts the AD converter between different measuring ranges when the analog measuring signal reaches given switch points.

Figure 8:
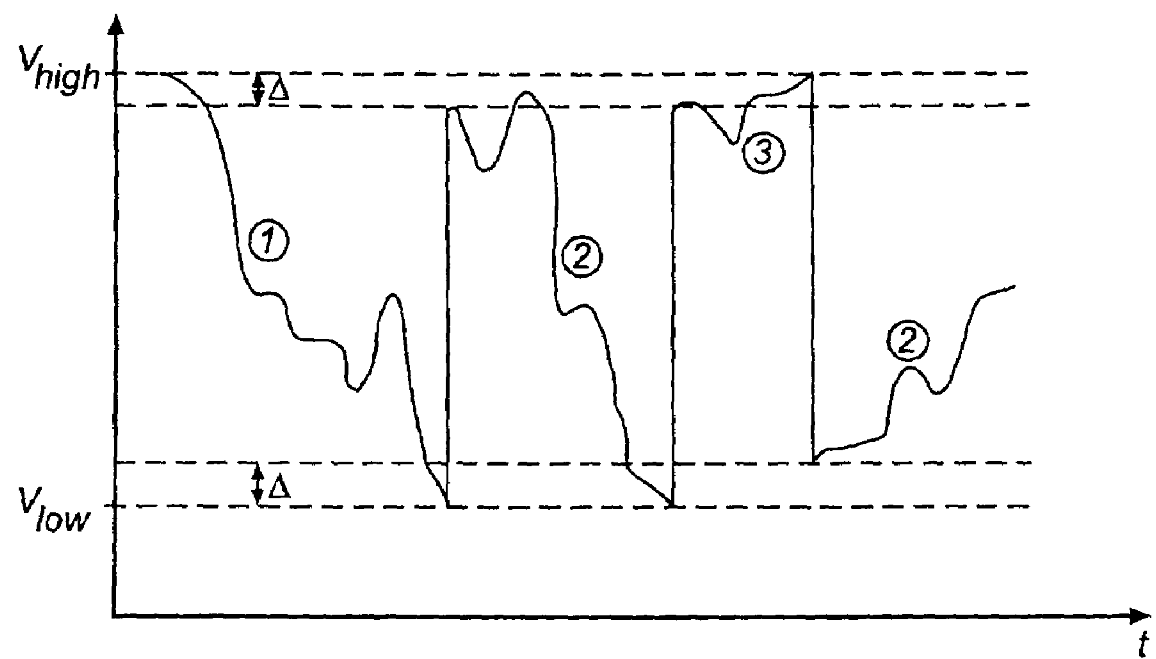
FIG. 8 is a diagram of an analog measuring signal which after preprocessing is received by an AD converter from a sensor arrangement.

In the second embodiment, the size of the measuring signal is instead controlled in relation to the voltage range $V_{min}$-$V_{max}$ of the AD converter by the constant current source being caused by a control unit to draw a predetermined current through the force sensor. The predetermined current is fixed to give, within a predetermined force range, measuring signals which with the desired resolution are mapped against the voltage range $V_{min}$-$V_{max}$ of the AD converter. It will be appreciated that the above problems are thus overcome without noise being amplified relative to the measuring signal. The thus controlled analog measuring signal is illustrated in FIG. 8 where the conversion range is limited by a high and a low switch point $V_{high}$ and $V_{low}$ respectively. These switch points can, but do not have to, coincide with the voltage levels that define the measuring range $V_{min}$-$V_{max}$. Each time the analog measuring signal reaches the low or the high switch point $V_{low}$, $V_{high}$, the constant current source is directed to a new current level which raises or lowers the measuring signal within the voltage range. Each such new current level defines a conversion range, indicated 1, 2 and 3 respectively in FIG. 8. The shift between the conversion ranges takes place with an offset Δ so that the measuring signal is directed from $V_{low}$ to $V_{high}-\Delta$, or respectively from $V_{high}$ to $V_{low}+\Delta$. In the shift between the conversion ranges, a hysteresis is thus introduced, which aims at preventing small signal variations, such as measuring signal noise, round the switch points $V_{low}$, $V_{high}$ from generating quick shifts back and forth between the conversion ranges.

It should be pointed out that, to each conversion range, different switch points can be assigned to which, in turn, different offsets can be assigned.

It should also be pointed out that the above hysteresis can also be introduced in the first embodiment involving controlling of the voltage range of the AD converter.

The resulting, digitised measuring signal is then issued with an indication of the associated conversion range. The receiver of the digitised measuring signal conveniently has access to the conversion data that indicates the size of each conversion range, and also calibration data corresponding to a parametrisation of the relationship between resistance and force of the force sensor. The relationship can be specific for a given force sensor, or an average relationship.

It should be pointed out that all of the circuit solutions that have been described above are generally applicable to electronic pens and can cooperate with any form of force sensor that can be caused to emit an analog measuring signal corresponding to the force applied to the pen stem of the pen. Such force sensors can be based on, for instance, magnetic detectors, as described in U.S. Pat. No. 5,565,632 or U.S. Pat. No. 5,895,895, or strain gauges, as described in U.S. Pat. No. 5,548,092.

6. Alternative Embodiments

The invention has been described above in the form of exemplary embodiments. However, the invention is in no way limited thereto and includes many other variants, as defined by the scope of protection of the appended claims and as will also be easily appreciated by a person skilled in the art.

According to an alternative, a pressure-sensitive layer can be applied to the active surface of the electrode. The closure can in such an embodiment be provided with a conductive or semiconductive material, possibly with pressure-sensitive properties.

In another alternative embodiment, the closure is made of a semiconductive material which in itself is not pressure sensitive. In such an embodiment, the sensor's sensitivity to force is achieved by the activator's abutment surface against the closure and, thus, the electronic contact area between the closure and the electrode being changed with the force of application.

According to still another alternative, the electrode element is provided with a plurality of conductor points distributed over the active surface, while the closure is provided with a planar electrode. If a voltage is applied between the electrode and the closure, a variation in electric current is obtained according to the contact area between the closure and the electrode.

Instead of the cantilevered construction as shown in the drawings, the sensor can be made up of a flexible, force-receiving closure which is arranged at a distance from and is fixedly connected to an electrode via a spacer of electrically insulating material. The spacer encompasses an active surface of the electrode and carries the closure so that the closure can be deformed to abut against the active surface. A similar sensor construction is known from the above U.S. Pat. No. 4,489,302 in connection with keys of electronic musical instruments.

The invention claimed is:

1. An electronic pen comprising a body, a pen stem slidingly received in said body, and a sensor arrangement whose electrical resistance varies in accordance with the amount of force applied to the sensor arrangement via the pen stem, wherein the sensor arrangement is designed as a modular unit with an electrode element and a closure element that are mutually arranged in an essentially electrically insulated initial position, that one of said elements is arranged to receive said force from the pen stem and thereby be urged to an activated position in electrical contact with the other element, and that, on relaxation of said force, the force-receiving element is arranged to automatically spring from the activated position back to the initial position, wherein the sensor arrangement comprises a sheet substrate with a closure area and an electrode area formed thereon, the substrate being bent such that the closure area and the electrode area form said closure element and said electrode element, respectively.

2. The electronic pen as set forth in claim 1, wherein the electrode element is integrated with the closure element.

3. The electronic pen as set forth in claim 1, wherein the force-receiving element is cantilevered in said sensor arrangement.

4. The electronic pen as set forth in claim 1, wherein said electrode element and said closure element are essentially planar.

5. The electronic pen as set forth in claim 1, wherein the closure element is the force-receiving element.

6. The electronic pen as set forth in claim 1, wherein the electrode element comprises two electrically separate conductor paths forming an active surface for cooperation with the closure element.

7. The electronic pen as set forth in claim 6, wherein at least a central surface portion of the active surface has an essentially uniform distribution of said conductor paths.

8. The electronic pen as set forth in claim 6, wherein the sensor arrangement comprises a spacer of electrically insulating material which, in said activated position, is arranged to at least partly encompass the active surface.

9. The electronic pen as set forth in claim 1, wherein the closure element includes a semiconducting material.

10. The electronic pen as set forth in claim 1, wherein the closure element includes a pressure-sensitive material.

11. The electronic pen as set forth in claim 1, further comprising a force-transmitting element which is attached to one end of the pen stem and has a rounded abutment surface for cooperation with the force-receiving element.

12. The electronic pen as set forth in claim 11, wherein the force-transmitting element is made of an elastic material.

13. The electronic pen as set forth in claim 11, wherein the force-transmitting element defines a blind hole which is adapted to receive said one end of the pen stem and whose peripheral wall has at least one longitudinal groove.

14. The electronic pen as set forth in claim 13, wherein the force-transmitting element comprises an insert which is arranged over the end wall of the blind hole and is made of a hard and durable material.

15. The electronic pen as set forth in claim 14, wherein the insert on its surface facing the blind hole is provided with at least one depression that extends from a central portion of said surface and connects to said longitudinal groove.

16. The electronic pen as set forth in claim 11, further comprising an elongate holder defining a first and a second chamber, wherein the sensor arrangement is mounted in the first chamber and the force-transmitting element is slidingly received in the second chamber for longitudinal movement into the first chamber against the spring action of the force-receiving element.

17. The electronic pen as set forth in claim 16, wherein the holder comprises a lug portion which is formed between the first and second chambers to limit the movement of the force-receiving element away from the other element.

18. The electronic pen as set forth in claim 16, wherein the holder defines a mounting opening which at least partly is defined by flexing sidewall portions that allow insertion of the force-transmitting element into the second chamber and limit its lateral movement therein.

19. The electronic pen as set forth in claim 16, wherein the holder comprises a guiding element for cooperation with a complementary guiding element on the body.

20. The electronic pen as set forth in claim 16, wherein the electrode and closure elements are interconnected by means of a web portion, and wherein the web portion is received in a guiding opening defined in a sidewall portion of the first chamber.

21. The electronic pen as set forth in claim 16, wherein a contacting opening is defined in a sidewall portion of the first chamber, and wherein the electrode element extends from the first chamber, through the contacting opening, into abutment against a contacting surface which is formed on the holder for contacting a circuit board arranged in the pen.

22. The electronic pen as set forth in claim 20, wherein a contacting opening is arranged opposite to the guiding opening.

23. The electronic pen as set forth in claim 1, wherein the electrode element comprises a layer of graphite.

* * * * *